United States Patent
Reist

(10) Patent No.: US 7,857,124 B2
(45) Date of Patent: Dec. 28, 2010

(54) CONVEYING APPARATUS HAVING A THRUST ELEMENT

(75) Inventor: Walter Reist, Hinwil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 171 days.

(21) Appl. No.: 12/160,697

(22) PCT Filed: Jan. 8, 2007

(86) PCT No.: PCT/CH2007/000009

§ 371 (c)(1), (2), (4) Date: Aug. 22, 2008

(87) PCT Pub. No.: WO2007/079603

PCT Pub. Date: Jul. 19, 2007

(65) Prior Publication Data

US 2010/0163371 A1 Jul. 1, 2010

(30) Foreign Application Priority Data

Jan. 13, 2006 (CH) .......................................... 56/06

(51) Int. Cl.
*B65G 17/24* (2006.01)
(52) U.S. Cl. ....................................... 198/779; 198/721
(58) Field of Classification Search ................ 198/717, 198/721, 725, 728, 779
See application file for complete search history.

(56) References Cited

U.S. PATENT DOCUMENTS

| 3,102,153 | A | | 8/1963 | Stieler et al. |
| 4,736,834 | A | * | 4/1988 | Kotegawa et al. ........... 198/779 |
| 5,791,455 | A | * | 8/1998 | Clopton ....................... 198/779 |
| 6,443,293 | B2 | * | 9/2002 | Patrito ......................... 198/779 |
| 6,896,122 | B2 | * | 5/2005 | Gambrell et al. ............. 198/779 |
| 7,523,820 | B1 | * | 4/2009 | Wu et al. ..................... 198/779 |

FOREIGN PATENT DOCUMENTS

| DE | 19701579 A1 | 6/1998 |
| DE | 20205069 U1 | 5/2003 |
| EP | 0488296 A1 | 6/1992 |
| WO | 2004/063059 A1 | 7/2004 |
| WO | 2005/113391 A3 | 12/2005 |
| WO | 2005/113392 A3 | 12/2005 |

* cited by examiner

*Primary Examiner*—James R Bidwell
(74) *Attorney, Agent, or Firm*—Rankin, Hill & Clark LLP

(57) ABSTRACT

In the conveying device (1) with pusher elements (2) every one of the pusher elements (2), respectively, comprises at least one roller element (3) and at least one spacer body (4), wherein the at least one spacer body (4) is designed for keeping pusher elements (2), which follow one another in the conveying device, at a distance from one another. In doing so, successive pusher elements (2) in conveying direction extend from a first end to a second end, and the pusher elements (2) in the zone of the first end are movably supported relative to a conveying track (7) by the at least one roller element (3). The pusher elements (2) in the zone of the second end are supported on an adjacent pusher element (2), and successive pusher elements (2) are loadable relative to one another only under compression, but not, however, under tension.

16 Claims, 4 Drawing Sheets

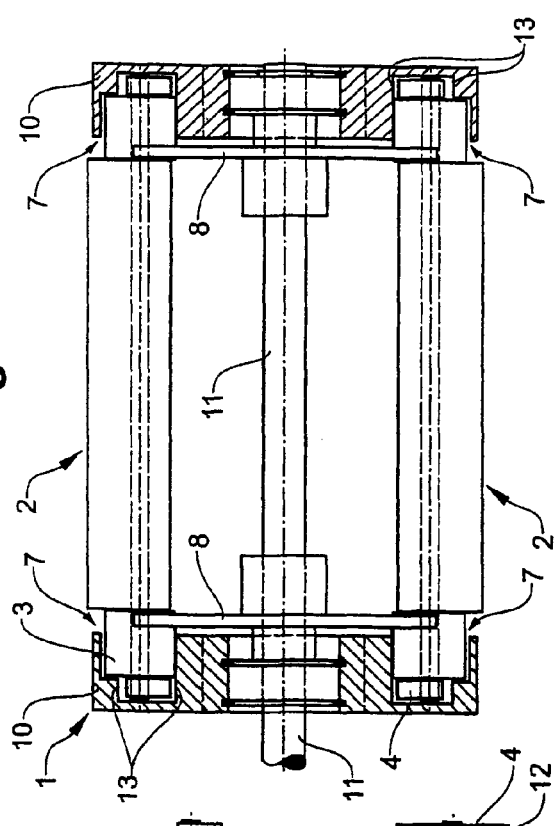
Fig.5
Fig.6
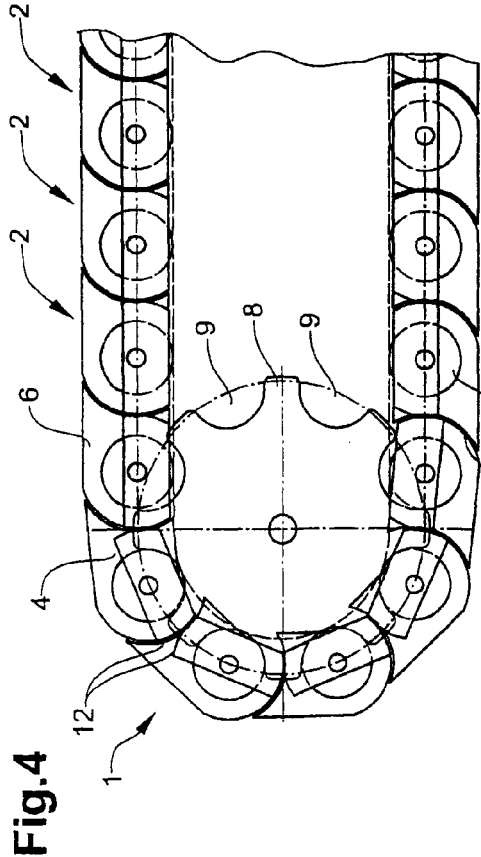
Fig.4
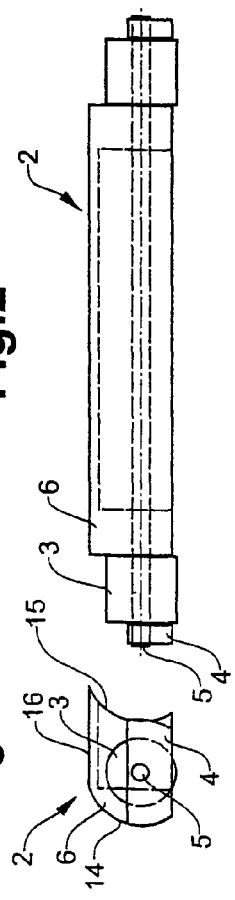
Fig.2
Fig.1
Fig.3

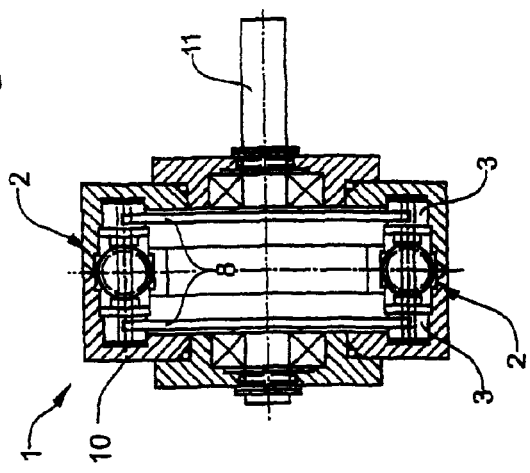
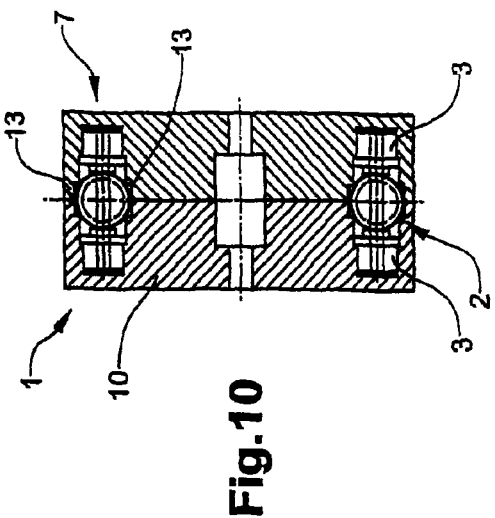
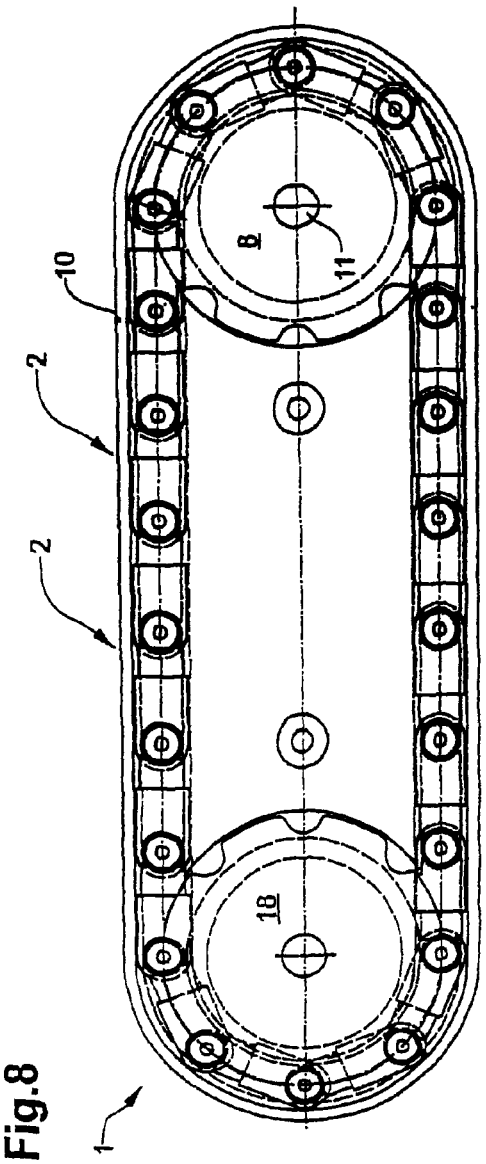
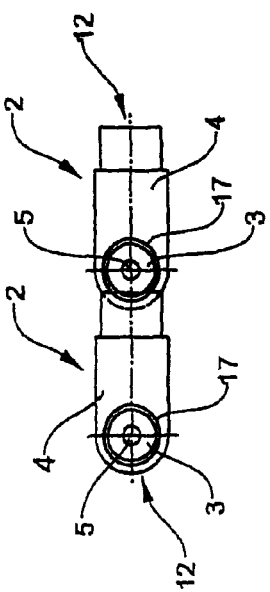

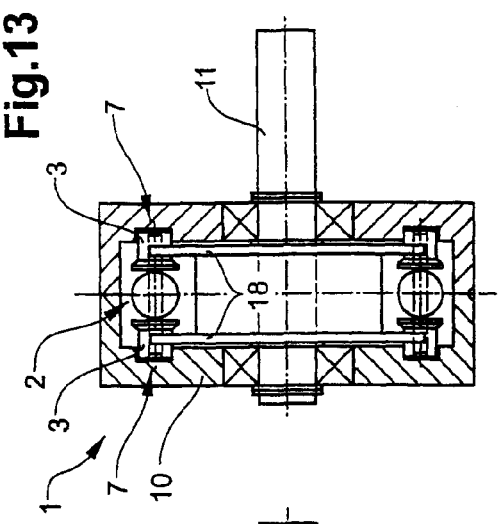
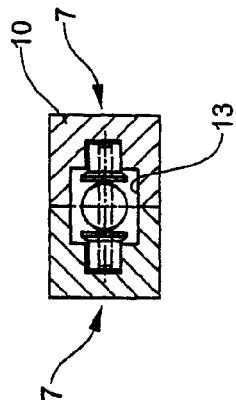
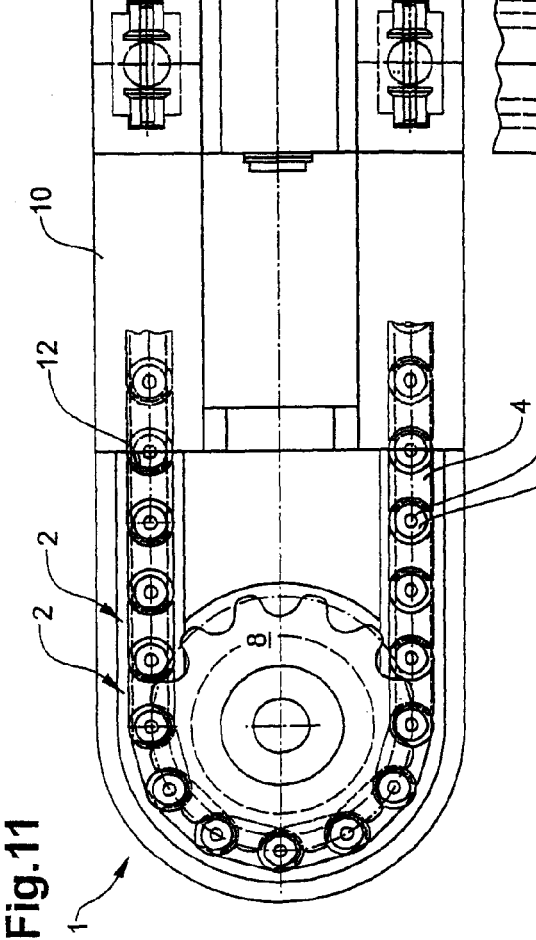
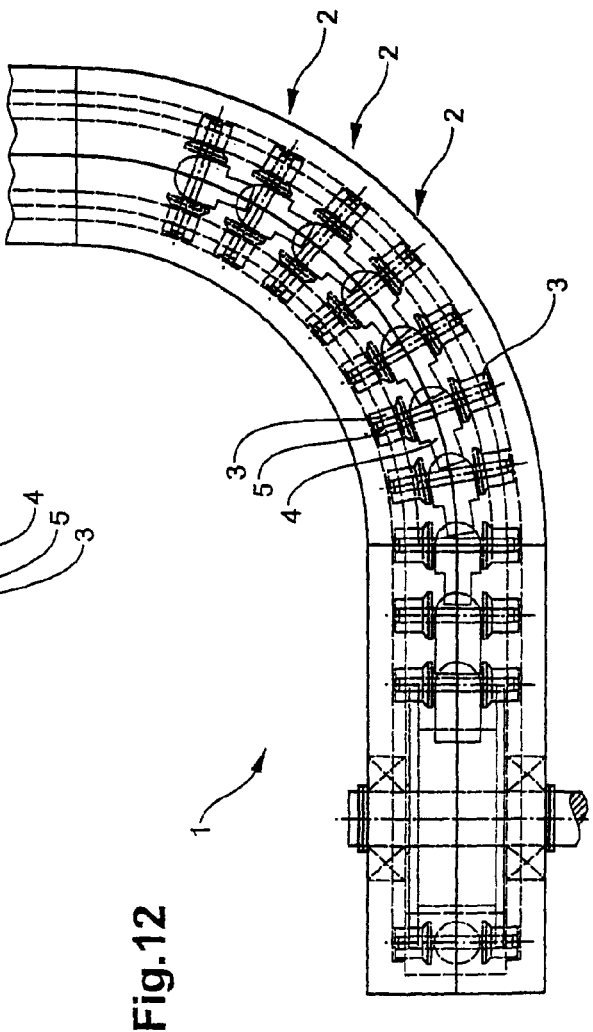

CONVEYING APPARATUS HAVING A THRUST ELEMENT

BACKGROUND OF THE INVENTION

1. Field of the Invention

The invention is related to the field of materials handling technology and in particular to a conveying device with pusher elements.

2. Description of Related Art

In case of known conveying systems, which include belts or chains of elements of the same kind, the length of the belts or chains always has to be adapted to the length of the conveying device. The belts or chains have to be threaded into the conveying device and subsequently connected to form a circulating device and then tensioned. In case of belt-like conveying devices, in addition, an as flat as possible surface has to be formed to receive objects to be conveyed. Furthermore, for moving the installation, as little force as possible should have to be exerted.

In WO 2004/063059 A1 a conveying system is described, which conveys by pushing and pulling rigid lamellas with compressible elements in between. The compressible elements are pre-tensioned in the conveying direction, i.e., partially compressed, and are able to be guided around curves without any gaps occurring in the conveying system. The lamellas comprise laterally protruding teeth, so that they are capable of being driven by correspondingly shaped teeth of a driving means.

EP 0 488 296 A1 discloses a conveying device, in which individual carrier elements, which are not hooked together, are pushed through a guide-way. The carrier elements at both ends respectively comprise rollers, with which they roll-off in a guide-way. The carrier elements are cylindrically shaped or, in another embodiment, when they are pushed together, they form a fairly flat plane. In the last mentioned embodiment the carrier elements are distanced from one another by spacer elements. When the carrier elements are conveyed around a curve, the spacer elements rub together and therefore make the conveyance more difficult.

In FR 143 262 a rapidly and simply utilisable transport aid is described, which comprises several pairs of rollers respectively rotatable around an axis. The axes are connected together in the middle by a flexible belt. At the ends, the axes respectively comprise wheels with a larger diameter than the rollers. The transport aid is capable of being designed in any type of track, whereby the rollers serve as a rolling surface for loads. By means of the wheels, the transport aid is also capable of being displaced.

In WO 2005/113 391 and WO 2005/113392 no conveying systems, but rather roller bearings are disclosed. Present in these are circulating rollers for receiving high loads. These rollers rotate around an oval roller body and are spaced between one another by bodies running along with them. As in the case of a conventional roller bearing, the rollers on the one hand roll off on the roller body and on the other hand on a counter body, and so absorb a load force between the roller body and the counter body.

None of the known conveying devices comprises the required characteristics.

BRIEF DESCRIPTION OF THE INVENTION

It is the objective of the invention to create a conveying device with pusher elements of the type mentioned at the beginning, which enables the transmission of high forces, and which is capable of being erected in a simple manner without requiring any particular adaptation work. A further objective of the invention is to create a conveying device, which includes a flat load surface without any gaps and capable of absorbing high loads. A further embodiment of the invention is to create a conveying device, which is utilisable as a drive for the transmission of high forces around curves.

In the conveying device with pusher elements, every pusher element, respectively, includes at least one roller element and at least one spacer body, wherein the at least one spacer body is designed for spacing pusher elements, which follow one another in the conveying device. In doing so, pusher elements following one another extend in the conveying direction from a first end to a second end, and the pusher elements in the zone of the first end are movably supported relative to a conveying track by the at least one roller element. In the zone of the second end, the pusher elements each respectively are supported on a following pusher element. Pusher elements following one another are loadable relative to one another only under compression, but not, however, under tension.

The pusher elements, therefore, are not coupled together, and they are only capable of transmitting pushing forces. In other words: The pusher elements lie loosely against one another and are able to move away from one another, as long as they are not pushed against one another. This makes it possible to manufacture and provide the pusher elements individually. When producing the conveying device, the pusher elements are one by one filled into a conveying track. It is not necessary to match a length of a belt or of a chain exactly to the length of the conveying track. For example, just as many pusher elements as possible are filled in. In doing so, when all other pusher elements are pushed against one another, in the normal case, a gap will still remain between two pusher elements. When driving the sequence of pusher elements, they are pushed together, and a gap of this kind can only occur just ahead of a drive. It is possible to design the conveying device in such a manner, that this gap is in a zone, where it does not bother.

The pusher elements comprise roller elements, which reduces the force necessary for driving a sequence of pusher elements. A pusher element is not, at both ends, directly supported relative to the conveying track by, for example, rollers, which are a part of the pusher element, but only at one end. At the other end the pusher element is supported relative to the conveying track indirectly through an adjacent (preceding or following) pusher element. Because the pusher elements are only supported at one end, wherein the pusher elements support each other mutually, the rolling resistance is kept low in comparison with multi-axis versions. It is possible for the drive to engage at the roller elements and/or at the spacer bodies and/or at the supporting elements of the pusher elements. For this purpose, in preferred embodiments of the invention, these are equipped with cams or catches.

In a preferred embodiment of the invention, the roller element or roller elements are rotatable relative to the at least one spacer body around a common geometrical axis. This therefore signifies, that two or more rollers, which are supported at the first end of the pusher element, are coaxial to one another. A "common geometrical axis" in other words signifies, that the roller elements are rotatable around the same rotation axis in the geometrical sense. This rotation axis may be formed by separate physical axis elements, which are in alignment with one another, or else, however, by a common physical axis or a common shaft. Each one of the pusher elements therefore comprises only a single axis, around which its roller elements rotate, and vice versa also the pusher element is rotatable around this axis relative to the roller element.

In another preferred embodiment of the invention, the roller elements include more than one geometrical axis. In preference, two rollers with parallel axes respectively are arranged at the first end of a pusher element and are spaced from one another in the direction vertical to the axis direction. In doing so, the two rollers, in preference, rotate in the same plane. The rollers run in a conveying track, which surrounds the pusher elements with the rollers and supports them rolling at the first end. Here too, the pusher elements at the second end are respectively pushed against a first end of an adjacent pusher element in positive engagement. Between the first and the second end, the pusher elements include support zones, which during normal rolling-off almost, but not completely, extend up to the conveying track. In the condition in which the pusher elements are moved away from one another, the pusher elements twist away slightly, until they are supported sliding on the conveying track. Because the pusher elements are only twisted away to a limited extent, they are pushed back into the correct position by being pushed together again by the respectively adjacent pusher element.

The same is applicable for the embodiments with only one geometrical axis of the rollers. If a gap is produced between two pusher elements which are not being pushed together, then the pusher element, on the basis of the force of gravity, or on the basis of other forces will rotate around this axis. When the pusher elements are pushed together again, the pusher elements must again reach the correct position relative to one another. For this purpose, the conveying track comprises guide means for loosely guiding the spacer bodies. These guide means prevent the pusher elements or also only the spacer bodies from twisting away too far from the correct position.

In a preferred embodiment of the invention, the spacer bodies include push transmitting surfaces, which are shaped as a segment of a surface of a cylinder or spherical surface, wherein the cylinder axis coincides with the axis, respectively, the center of the sphere is located on the axis of the respective pusher element. This makes possible, when the pusher elements move around a curve of the conveying track, a mutual twisting of the spacer bodies without any change of the distance between the axes of the pusher elements.

In a further preferred embodiment of the invention, the pusher elements respectively include a carrier element for conveying objects. With this, it is possible to establish a conveying device for conveying objects, wherein the objects, for example, are placed on a flat surface of the carrier elements.

In a further preferred embodiment of the invention, the carrier elements are formed by successive pusher elements corresponding to one another, and when the pusher elements are moved around a curve, the carrier elements move sliding relative to one another, wherein load surfaces of the carrier elements together form a surface for conveying objects. A conveying surface of this kind is similar to a conveyor belt, but has a much higher load bearing capacity, without any sagging and without supporting rollers becoming perceptible through the belt.

In other preferred embodiments of the invention, the carrier elements include means for the occasional holding of objects, for example, grippers.

In a further preferred embodiment of the invention the pusher elements are driven by a drive wheel and they themselves once again drive a power take-off wheel. Between these wheels a conveying track of the pusher elements may essentially include any kind of course. It is therefore possible to implement a transmission for transmitting high forces with a free selection of the position of the axes of drive and power take-off.

Further preferred embodiments follow from the dependent claims.

BRIEF DESCRIPTION OF THE DRAWINGS

In the following, the object of the invention is explained in more detail on the basis of preferred examples of embodiments, which are illustrated in the attached drawings. These respectively schematically depict:

FIGS. 1-3 various views of a pusher element in accordance with a first embodiment of the invention;

FIG. 4 a sequence of pusher elements of the FIGS. 1-3 in a conveying device;

FIG. 5 the intermeshing of drive and rollers in this conveying device;

FIG. 6 a cross section through this conveying device;

FIG. 7 two pusher elements in a further embodiment of the invention;

FIGS. 8-10 various views and sections of a transmission with the pusher elements of FIG. 7;

FIGS. 11-14 various views and sections of a further transmission; and

The reference marks utilised in the drawings and their significance are listed in summary in the list of reference marks. On principle in the Figures the same parts are identified with the same reference marks.

DETAILED DESCRIPTION OF THE INVENTION

Figure 15:
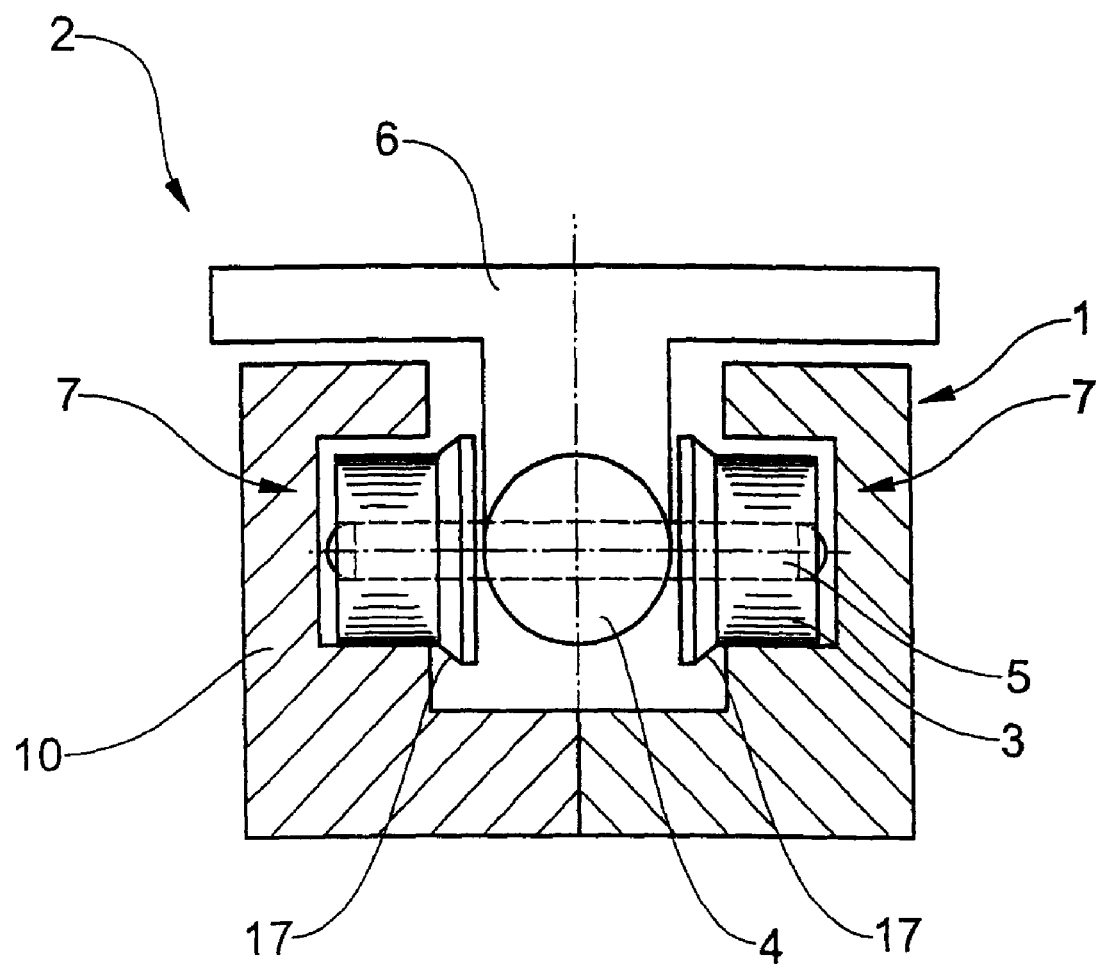
FIG. 15 a part of a conveying device with a pusher element with a carrier element.

FIGS. 1-3 illustrate different views of a pusher element 2 in accordance with a first embodiment of the invention. The pusher element 2 comprises a carrier element 6, two rollers 3 and two spacer bodies 4. Viewed in the conveying direction, the carrier element 6 is arranged in the middle of the pusher element 2, and on the left and on the right of the carrier element 6, respectively, a roller 3 and a spacer body 4 are arranged rotatable around an axis 5. The rollers 3 are completely and continuously rotatable around the axis 5. The spacer bodies 4 are rotatable around the axis 5 at least to such an extent that the spacer bodies 4, when running around a deflection wheel or drive wheel 8, remain in contact with one another. This embodiment is above all, but not exclusively suitable for tracks, the curve axes of which extend parallel to the axes 5.

The spacer bodies 4 are longish, extend in the conveying direction and comprise push transmission surfaces 12, which are shaped as a segment of a cylindrical surface, wherein the cylinder axis coincides with the axis 5. The carrier element 6 comprises a first contact surface 14, which is shaped as a segment of a cylindrical surface, wherein the cylinder axis also coincides with the axis 5. The cylinder radius in the case of the push transmission surfaces 12 is slightly greater than in the case of the first contact surface 14. Furthermore, the carrier element 6 comprises a second contact surface 15, which, relative to the axis 5, lies opposite the first contact surface 14 and is shaped as a negative of the first contact surface 14.

The force between the pusher elements 2 is, therefore, transmitted through the slightly larger spacer bodies 4. Successive carrier elements 6 slightly touch one another at the correspondingly shaped (positive/negative) cylinder surfaces and mutually support one another as long as the pusher elements 2 are pushed against one another. The load surfaces 16 absorb a load of conveyed objects and through the axis 5 and the rollers 3 transmit it to the guide body 10. Drive forces and load forces are therefore transmitted through separate elements.

FIG. 4 depicts a sequence of pusher elements 2 of the FIGS. 1-3 in a conveying device 1. The pusher elements 2 are guided over a deflection wheel, which is also capable of acting as a drive wheel 8 or power take-off wheel. The axis of the drive wheel 8 here extends parallel to the axes 5 of the pusher elements 2. During the deflection by the drive wheel 8, the spacer bodies 4 rotate against one another and with the push transmitting surfaces 12, roll-off on one another, whereby the distance between the axes 5 remains the same. Furthermore, also, the carrier elements 6 slide against one another on their contact surfaces 14, 15, so that no gap is produced between the carrier elements 6.

FIG. 5 depicts the intermeshing of the drive 8 and the rollers 3 in this embodiment. The size of the spacer bodies 4 and carrier elements 6 and the spacing of recesses 9 in the drive wheel 8 are matched to one another in such a manner that the rollers 3 respectively come to lie in the suitably shaped recesses 9. By the rollers 3 lying in the recesses 9, the pusher elements 2 are pushed further and through the conveying device 1.

FIG. 6 depicts a cross section through this conveying device 1. In addition to the already mentioned elements, here a conveying track 7 is to be seen as a circulating groove in the guide body, in which conveying track 7 the rollers 3 run. The spacer bodies 4 are conducted between guide surfaces 13 in the conveying track 7, which limit the twisting of the spacer bodies 4 relative to the axes 5. It is also to be seen that the drive wheel 8 comprises two parallel disks, which engage on the rollers 3 on both sides of the pusher elements 2.

In a further embodiment of the invention, the first contact surface 14 and the second contact surface 15 are curved in two directions. For example, they respectively form a section of a spherical surface or of a surface of a toroid or of a three-dimensional ellipsoid. With this, the carrier elements 6 are able to twist against one another around two axes. Depending on around which axis or axes the mutual twisting takes place, the one or the other shape has to be selected. In doing so, a perfect positive locking of the two surfaces is not always able to be assured, but possibly only a positive locking sufficiently accurate for small movements. To be assured in this respect, in particular in case of the transitions between successive load surfaces 16, is an as smooth as possible transition without a gap.

In further embodiments of the invention, a pusher element 2 comprises more than two rollers 3, and/or subdivided carrier elements 6. For example, in the embodiment of FIG. 2 in the middle of the axis 5, a further roller may be arranged, in order to absorb higher forces. The carrier element 6 is also able to consist of several individual parts. These, in their totality, form a discontinuous or multi-part first contact surface 14, second contact surface 15, and load surface 16. For absorbing higher load forces, it is also possible to arrange several tracks next to one another in accordance with FIG. 6.

FIG. 7 depicts two pusher elements 2 in a further embodiment of the invention. The pusher elements 2 viewed in conveying direction comprise a single spacer body 4 in the middle of the pusher element 2, and on the left and right of the spacer body 4 each respectively a roller 3, which is arranged as rotatable around the axis 5.

The spacer bodies 4 are longish and comprise push transmitting surfaces 12, of which one lot respectively are shaped as a segment of a spherical surface, wherein the center of the sphere is situated on the axis 5. The other push transmitting surfaces 12 are arranged at a distance from the axis 5 and are shaped as spherical shells with the same radius. This embodiment therefore is above all but not exclusively suitable for tracks, the curvature axes of which extend parallel and/or vertically to the axes 5.

The rollers 3 may be individually supported on the axis 5, or else fixed on a common shaft, which leads through the spacer body 4. In a preferred embodiment of the invention, the rollers 3 respectively comprise a wheel flange, that is, a section with a greater radius and with a slanting flank 17 for lateral guidance. With this, similar to in the case of a railway, the rollers 3 are able to be pushed around a curve, the curve axis of which extends vertically to the axes 5 of the pusher elements 2. Instead of a wheel flange on the rollers, it is also possible that the spacer bodies 4 and/or the guide bodies 10 comprise means for the lateral guidance, for example, grooves or protruding elements. For lateral guidance, the rollers are also able to comprise grooves and/or be bossed (bomb shaped), i.e., shaped similar to a barrel.

FIGS. 8-10 depict various views and sections of a transmission with the pusher elements 2 of FIG. 7. Here, the conveying device 1 therefore does not serve to convey further objects, but rather to convey the pusher elements 2 themselves around a circulating conveying track 7, and for the force transmission through the pusher elements 2. In this, one of the deflection wheels is utilised as the drive wheel 8 and the other one as the power take-off wheel 18. The function drive/power take-off, however is also reversible. In another embodiment of the invention, the drive wheel 8 and the power take-off wheel 18 comprise differing radii.

FIG. 8 depicts a side view, FIG. 9 a cross section in the zone of a drive wheel 8 or power take-off wheel 18, and FIG. 10 a cross section in the zone located in between. In FIG. 10 it is apparent, how a wall of the conveying track 7 acts as guide surface 13. If a gap occurs between two pusher elements 2, the spacer body 4 is only able to twist away so far, until the free end, i.e., the end at a distance from the axis 5, is adjacent to the guide surface 13. When the gap is closed later on, the push transmitting surface 12 of the following pusher element 2 pushes the spacer body 4 into the middle position again, as is normal in case of the pushing force transmission.

FIGS. 11-14 depict various views and sections of a further transmission. The operating principle is the same as in case of the embodiment in accordance with the FIGS. 8-10, here, however, a guide around two different curvature axes is illustrated. The axes of the drive wheel 8 and the power take-off wheel 18 are therefore not parallel to one another. FIG. 11 depicts a side view of a transmission, FIG. 12 a partial view from above, FIG. 13 a cross section in the zone of a deflection—or power take-off wheel 18, and FIG. 14 a cross section in the zone located in between. In principle a transmission of this kind with pushing pusher elements 2 is also capable of being implemented with pusher elements 2 without rollers 3, wherein the drive wheel 8 and the power take-off wheel 18 engage at the pusher elements themselves.

FIG. 15 illustrates a part of a conveying device 1 with a pusher element 2 with a carrier element 6. The carrier element 6 is fixed to the spacer body 4 or is constructed in one piece with it. The guide body 10 comprises a circulating slot, through which the carrier element 6 extends outwards. In a preferred embodiment of the invention, the conveying track 7 is only curved around one axis vertical to the axes 5. The conveying track 7 in principle is also capable of comprising any three-dimensional curvatures in all directions and twists, respectively, torsions. The spacer bodies 4 comprise a cylindrical push transmitting surface 12, the cylinder axis of which extends parallel to the curvature axes, and the carrier elements 6 comprise first contact surfaces 14, which also cylindrically with the cylinder axis are parallel to the curvature axes.

| LIST OF REFERENCE MARKS | |
|---|---|
| 1 | Conveying device |
| 2 | Pusher element |
| 3 | Roller |
| 4 | Spacer body |
| 5 | Axis |
| 6 | Carrier element |
| 7 | Conveying track |
| 8 | Drive wheel |
| 9 | Recess |
| 10 | Guide body |
| 11 | Drive shaft |
| 12 | Push transmitting surface |
| 13 | Guide surface |
| 14 | First contact surface |
| 15 | Second contact surface |
| 16 | Load surface |
| 17 | Flank |
| 18 | Power take-off wheel |

The invention claimed is:

1. Conveying device for conveying individual pusher elements, wherein every pusher element respectively comprises:
   at least one roller element; and
   at least one spacer body,
   wherein the at least one spacer body is designed for spacing pusher elements, which follow one another in the conveying device, and
   wherein successive pusher elements in the conveying direction extend from a first end to a second end, and
      the pusher elements in the zone of the first end are movably supported relative to the conveying track by the at least one roller element, and
      the pusher elements in the zone of the second end are supported on a following pusher element, and that
      successive pusher elements relative to one another are loadable only under pressure, but not, however under tension, and
   wherein viewed in the conveying direction a spacer body is arranged in the center of the pusher element and on the left and right of the spacer body, respectively, a roller is arranged as rotatable around an axis, wherein every pusher element comprises only one axis of this kind with rollers.

2. Conveying device in accordance with claim 1, wherein push transmitting surfaces of the spacer body on one side are formed as spherical surfaces and on the other side as spherical shells, and the center of the spherical surfaces respectively is located on the axis.

3. Conveying device in accordance with claim 1, wherein the rollers respectively comprise a section with a slanting flank for lateral guidance.

4. Conveying device in accordance with claim 1, wherein the conveying device is designed as a transmission for transmitting force from a drive means to a power take-off means, wherein a set of pusher elements by a conveying device is guided around a circulating conveying track and the pusher elements in doing so intermittently are in engagement with the drive means and with the power take-off means.

5. Conveying device in accordance with claim 4, wherein the conveying track comprises guide means for loosely guiding the spacer bodies, so that in case of pusher elements, which have moved away from one another, during the renewed moving together the spacer bodies reach the correct position for push transmitting, and in this position are supported on one another.

6. Conveying device for conveying individual pusher elements, wherein every pusher element respectively comprises:
   at least one roller element; and
   at least one spacer body,
   wherein the at least one spacer body is designed for spacing pusher elements, which follow one another in the conveying device, and
   wherein successive pusher elements in the conveying direction extend from a first end to a second end, and
      the pusher elements in the zone of the first end are movably supported relative to the conveying track by the at least one roller element, and
      the pusher elements in the zone of the second end are supported on an adjacent pusher element, and that
      successive pusher elements are loadable relative to one another only under compression, not, however, under tension, and in which
   the pusher elements respectively comprise a carrier element for conveying objects and the carrier elements of successive pusher elements are shaped corresponding to one another and during the moving of the pusher elements around a curve the carrier elements move together,
   wherein load surfaces of the carrier element together form a surface for conveying objects, and
   the spacer bodies of a pusher element comprise push transmitting surfaces, which are shaped as a segment of a common cylinder surface,
   wherein the cylinder axis coincides with the axis and during a deflection of the pusher elements the spacer bodies turn against one another around the axes and roll-off against one another on the push transmitting surfaces.

7. Conveying device in accordance with claim 6, wherein the spacer bodies do not protrude beyond the load surfaces.

8. Conveying device in accordance with claim 6, wherein the spacer bodies are rotatable around an axis and are guided between guide surfaces in the conveying track, and
   wherein the guide surfaces limit a turning of the spacer bodies relative to the axes.

9. Conveying device in accordance with claim 6, wherein the carrier element comprises:
   a first contact surface, which is shaped as a segment of a cylindrical surface or spherical surface,
   wherein the cylinder axis coincides with the axis, respectively, the center of the sphere is located on the axis, and the carrier element comprises a second contact surface, which relative to the axis is located opposite the first contact surface and is shaped as a negative of the first contact surface.

10. Conveying device in accordance with claim 9, wherein:
   the first contact surface of the carrier element and the push transmitting surfaces on at least one side of the spacer bodies are cylindrically shaped and comprise the same cylinder axis, and
   wherein the cylinder radius in case of the cylinder radius in case of the push transmitting surfaces is slightly greater than in case of the first contact surface.

11. Conveying device in accordance with claim 6, wherein, viewed in the conveying direction, the carrier element is arranged in the middle of the pusher element, and on the left and right of the carrier element respectively a roller and a spacer body are arranged as rotatable around the axis.

12. Conveying device in accordance with claim 6, further comprising a drive means, which is designed for conveying the pusher elements and pushes the pusher element along a conveying track, and wherein the drive means engages on the roller elements of the pusher elements.

13. Conveying device in accordance with claim 12, wherein the conveying track comprises guide means for the loose guiding of the spacer bodies, so that in case of pusher elements, which have moved away from one another, during the renewed moving against one another the spacer bodies reach the correct position for push transmitting, and in this position are supported on one another.

14. Conveying device in accordance with claim 6, wherein the roller element or the roller elements relative to the at least one spacer body are rotatable around precisely one common geometrical axis.

15. Conveying device in accordance with claim 6, wherein the spacer bodies comprise push transmitting surfaces, which are shaped as a segment of a cylindrical surface or spherical surface, wherein the cylinder axis coincides with the axis, respectively, the center of the sphere is located on the axis.

16. Pusher element, for utilization in the conveying device in accordance with claim 1.

* * * * *